3,127,372
STABILIZATION OF POLYOLEFINS
Albert S. Matlack, Wilmington, Del., assignor to Hercules Powder Company, Wilmington, Del., a corporation of Delaware
No Drawing. Filed Feb. 10, 1961, Ser. No. 88,313
6 Claims. (Cl. 260—45.75)

The present invention relates to polyolefin compositions and, more particularly, to the stabilization of stereoregular polymers of propylene and higher α-olefins against degradation by light.

Highly crystalline, high molecular weight stereoregular polymers (also referred to as isotactic polymers) of propylene and higher α-olefins are well known. One of the deficiencies of such polymers which must be overcome to enable their use in many applications is poor stability against the deleterious effect of light.

In accordance with the present invention it has been found that the stereoregular polymers of propylene and higher α-olefin scan be stabilized very effectively against the deleterious effects of light by incorporating in such polymers a small amount of a nickel compound selected from the group consisting of bis(8-hydroxyquinoline) nickel complexed with one molecule of the diglycidyl ether of 4,4'-isopropylidenediphenol, bis(8-hydroxyquinoline) nickel complexed with 3 molecules of pyridine, and bis(8-hydroxyquinoline) nickel complexed with 2 molecules of an alkylamine in which the alkyl group contains at least 3 carbon atoms.

Although any stereoregular polymer of a mono-α-olefin having at least 3 carbon atoms can be stabilized by means of the invention, the invention is particularly useful in stabilizing stereoregular polymers of monoolefins having from 3 to 6 carbon atoms including, for instance, polypropylene, poly(butene-1), poly(pentene-1), poly(3-methylbutene-1), and poly(4-methyl-pentene-1).

The nickel compounds used as additives in accordance with the invention increase the light stability of stereoregular polypropylene and related stereoregular polymers quite markedly. An even further increase in light stability can be achieved, however, by also incorporating a phenolic compound in the polymer. In fact, such outstanding light stability is obtained that it makes these stereoregular polymers useable for many applications requiring prolonged outdoor exposure in milder climates.

The nickel compounds that are used for the stabilization of stereoregular polymers in accordance with the invention can be made from bis(8-hydroxyquinoline) nickel dihydrate by methods known to the art. The pyridine complex employed in the subsequent examples was prepared by the method of Basolo et al., J.A.C.S., 75, 5663 (1953). The n-octadecylamine complex employed in the examples was prepared by heating bis(8-hydroxyquinoline) nickel dihydrate in boiling chloroform with the calculated amount of n-octadecylamine while allowing the water of reaction and part of the chloroform to distill off. This resulted in a chloroform solution of the product which was used for incorporating the nickel complex into the polymer. In addition to n-octadecylamine, complexes can be made from other alkylamines such as isopropylamine, n-butylamine, n-dodecylamine, etc. The complex from the diglycidyl ether of 4,4'-isopropylidenediphenol was made in the same manner as the n-octadecylamine complex.

The invention will be illustrated by the following examples in which parts and percentages are by weight unless otherwise specified.

EXAMPLE 1

In this example stereoregular polypropylene having a birefringent melting point of about 168° C. and a reduced specific viscosity of 3.8 (measured on a 0.1% solution of decahydronaphthalene at 135° C.) was thoroughly blended with 0.5%, based on the amount of polypropylene, of bis(8-hydroxyquinoline)nickel complexed with 3 molecules of pyridine. The blend was extruded into molding powder at 210° C. and the molding powder was then pressed into sheets 25 mils thick. Strips cut from these sheets, and 0.5 inch wide, were fastened onto pieces of white cardboard and exposed in a Fade-Ometer. During the exposure, the development of brittleness in each strip was observed by periodically examining the strip and noting the time elapsed until it became brittle to the extent that the strip breaks when bent double. Exposure data are as follows:

Table 1

| | Embrittlement time, hours |
|---|---|
| Control (no stabilizer) | 24 |
| Stabilized polymer | 120 |

EXAMPLE 2

The same procedure as in Example 1 was followed except in this case the polymer additionally contained 0.5% of the reaction product of 2 moles of nonylphenol and 1 mole of acetone, the reaction product comprising a mixture of isopropylidene-bis-(nonylphenol) and 2(2'-hydroxyphenyl)-2,4,4-trimethyl - 5',6 - dinonylchroman. The embrittlement time was increased to 360 hours by the addition of the phenolic ingredient.

EXAMPLE 3

The procedure was the same as in Example 1 except that the stabilizer was bis(8-hydroxyquinoline)nickel complexed with 2 molecules of n-octadecylamine which was incorporated as a chloroform solution, the chloroform being allowed to evaporate during blending.

Results were as follows:

| | Embrittlement time, hours |
|---|---|
| Control | 24 |
| Stabilized polymer | 130 |

EXAMPLE 4

Example 3 was repeated with the addition of 0.5%, based on the amount of polymer, of the nonylphenol-acetone reaction product described in Example 2. Embrittlement time was increased by this addition to 280 hours by the addition of the phenolic component.

EXAMPLE 5

Example 2 was repeated with the substitution of an equal weight of bis(8-hydroxyquinoline)nickel complexed with one molecule of the diglycidyl ether of 4,4'-isopropylidenediphenol for the nickel compound of Example 2. Embrittlement time was 280 hours.

The amount of the nickel compound incorporated in the polymer can be varied from a very small amount up to several percent. More specifically, beneficial results are normally obtained when it is employed in an amount from 0.01% to about 5% by weight of the polymer.

As previously mentioned, one of the preferred, but optional, modifications of the invention comprises incorporating into the polymer a phenolic compound in addition to the nickel compound. The phenolic compound, when used, preferably comprises from 0.01 to 5% by weight of the polymer. Suitable phenolic compounds that are useful in this embodiment include alkyl phenols, bis-phenols, terpene phenols, aralkyl phenols, and polyalkylchromans. Typical alkyl phenols that can be used include di-tert-butyl-p-cresol, o-nonylphenol, o,o-diisopropylphenol, etc. Bisphenols that are useful include
2,2'-methylene-bis-(5-isopropylphenol),
2,2'-methylene-bis-(4-methyl-6-isopropylphenol),
2,2'-methylene-bis-(4-methyl-6-tert-butylphenol),
2,2'-methylene-bis-(4-tert-butyl-6-methylphenol),
2,2'-methylene-bis-(4,6-di-tert-butylphenol),
2,2'-methylene-bis-(4-nonylphenol),
2,2'-methylene-bis-(4-decylphenol),
4,4'-methylene-bis-(2,6-di-tert-butylphenol),
4,4'-methylene-bis-(2-methyl-6-tert-butylphenol),
2,2'-ethylidene-bis-(4-methyl-6-tert-butylphenol),
2,2'-ethylidene-bis-(4,6-di-tert-butylphenol),
2,2'-ethylidene-bis-(4-octylphenol),
2,2'-ethylidene-bis-(4-nonylphenol),
2,2'-isopropylidene-bis-(4-methyl-6-isopropylphenol),
2,2'-isopropylidene-bis-(4-isopropylphenol),
2,2'-isopropylidene-bis-(4-isopropyl-6-methylphenol),
2,2'-isopropylidene-bis-(4-methyl-6-tert-butylphenol),
2,2'-isopropylidene-bis-(4-octylphenol),
2,2'-isopropylidene-bis-(4-nonylphenol),
2,2'-isopropylidene-bis-(4-decylphenol),
2,2'-isobutylidene-bis-(4-methyl-6-tert-butylphenol),
2,2'-isobutylidene-bis-(4-nonylphenol), etc.

Polyalkyl chromans that can be employed include
2(2'-hydroxyphenyl)-2,4,4,5',6-pentamethylchroman,
4(2'-hydroxyphenyl)-2,2,4,5',6-pentamethylchroman,
2(2'-hydroxyphenyl)-5',6 - diisopropyl-2,4,4 - trimethylchroman,
2(2'-hydroxyphenyl)-5',6-diisopropyl - 2,4,4,3',8 - pentamethylchroman,
2(2'-hydroxyphenyl)-5',6-di-tert-butyl-2,4,4 - trimethylchroman,
4(2'-hydroxyphenyl)-5',6-di-tert-butyl - 2,2,4 - trimethylchroman,
2(2'-hydroxyphenyl)-5',6-dioctyl-2,4,4-trimethylchroman,
2(2'-hydroxyphenyl)-5',6-dinonyl-2,4,4-trimethylchroman,
4(2'-hydroxyphenyl)-5',6-dinonyl-2,2,4-trimethylchroman,
2(2'-hydroxyphenyl)-5',6 - didecyl - 2,4,4 - trimethylchroman, etc.

Terpene phenols useful in this modification are reaction products of a terpene and a phenol as exemplified by 2,6-diisobornyl-p-cresol, 2,4-dimethyl-6-isobornylphenol, and similar products made by condensing phenol or an alkylphenol with a cyclic unsaturated terpene or dihydroterpene, e.g., camphene, carvomenthene, dipentene, α-pinene and the like.

The composition of the invention can also contain one or more additives in addition to those already mentioned. Such other additives include, for instance, pigments, dyes, antacids, fillers, and the like.

What I claim and desire to protect by Letters Patent is:

1. A stereoregular polymer of an α-olefin selected from the group consisting of propylene, butene-1, pentene-1, 3-methyl butene-1, and 4-methyl pentene-1 containing as a light stabilizer therefor a small amount of a nickel compound selected from the group consisting of bis(8-hydroxyquinoline)nickel complexed with one molecule of the diglycidyl ether of 4,4'-isopropylidenediphenol, bis-(8-hydroxyquinoline)nickel complexed with 3 molecules of pyridine, and bis(8-hydroxyquinoline)nickel complexed with 2 molecules of an alkylamine in which the alkyl group contains at least 3 carbon atoms.

2. The composition of claim 1 in which the stabilizer is bis(8-hydroxyquinoline)nickel complexed with 3 molecules of pyridine.

3. The composition of claim 1 in which the stabilizer is bis(8-hydroxyquinoline)nickel complexed with 2 molecules of n-octadecylamine.

4. The composition of claim 1 in which the stabilizer is bis(8-hydroxyquinoline)nickel complexed with one molecule of the diglycidyl ether of 4,4'-isopropylidenediphenol.

5. The composition of claim 1 containing also a small amount of a phenolic compound.

6. The composition of claim 1 in which the polymer is polypropylene.

References Cited in the file of this patent
UNITED STATES PATENTS

| | | |
|---|---|---|
| 2,985,617 | Salyer et al. | May 23, 1961 |
| 3,006,886 | Schilling | Oct. 31, 1961 |